United States Patent [19]

Baum et al.

[11] Patent Number: 5,774,299
[45] Date of Patent: Jun. 30, 1998

[54] ADAPTIVE CALIBRATION OF READ/WRITE ELEMENTS IN A DISC DRIVE

[75] Inventors: Michael E. Baum, Longmont; James J. Touchton, Boulder; Keith W. Malang, Longmont, all of Colo.

[73] Assignee: Seagate Technology, Inc., Scotts Valley, Calif.

[21] Appl. No.: 696,120

[22] Filed: Aug. 13, 1996

[51] Int. Cl.[6] .................................................. G11B 5/596
[52] U.S. Cl. ..................................... 360/77.08; 360/77.02
[58] Field of Search ........................... 360/77.04, 77.08, 360/78.09, 77.02, 75

[56] References Cited

U.S. PATENT DOCUMENTS

| | | | |
|---|---|---|---|
| 4,197,564 | 4/1980 | Ravizza . | |
| 4,551,776 | 11/1985 | Roalson | 360/77.02 |
| 4,890,172 | 12/1989 | Watt et al. | 360/77.04 |
| 5,251,194 | 10/1993 | Yoshimoto et al. . | |
| 5,369,345 | 11/1994 | Phan et al. | 318/561 |
| 5,384,671 | 1/1995 | Fisher | 360/51 |
| 5,404,255 | 4/1995 | Kobayashi et al. | 360/78.09 |
| 5,408,367 | 4/1995 | Emo | 360/53 |
| 5,539,714 | 7/1996 | Andrews, Jr. et al. | 360/77.04 X |
| 5,550,685 | 8/1996 | Drouin | 360/77.04 X |

*Primary Examiner*—Aristotelis M. Psitos
*Assistant Examiner*—James L. Habermehl
*Attorney, Agent, or Firm*—Kinney & Lange, P.A.

[57] ABSTRACT

The track follow gain control of an actuator controller is calibrated by injecting a sinusoidal signal into the position error signal during a servo burst interrupt. The injected signal is bandpass filtered to optimize the coherence of the measurement. A sine error signal is derived based on the filtered (sine actual) signal and a sine desired signal. The sine error signal is applied to the track follow gain control to adjust the amplitude of the control signal to the actuator based on the sine error signal. The sine error is derived by averaging the peaks of the filtered injected signal and subtracting the averaged signal from the desired signal which represents the expected error of the sinusoidal signal under ideal conditions. The recording surfaces may be segmented into a plurality of radial zones in which case a central track is identified in one zone on a selected disc surface. The sine error signal is derived for that zone, after which the process is repeated for the corresponding zone of each other recording surface. The sine error signals derived from the several disc surfaces are averaged to adjust the track follow gain control for the common zone of all disc surfaces.

20 Claims, 5 Drawing Sheets

ADAPTIVE CALIBRATION OF READ/WRITE ELEMENTS IN A DISC DRIVE

BACKGROUND OF THE INVENTION

This invention is related to calibrating the gain of a servo system for read/write transducer elements in a high data density disc drive system.

Disc drives employ one or more magnetic discs rotated by a spindle motor. A plurality of concentric data tracks are radially positioned across the disc between an inner diameter and an outer diameter. Each of the data tracks has the ability to store data in the form of magnetic transitions within the radial extent of the track. An interactive element, such as a magnetic transducer, is capable of sensing magnetic transitions on the track to read data, or to convert an electric signal to record magnetic transitions on the track to write data. The magnetic transducer ordinarily includes separate read and write gaps that contain interactive elements of the transducer at positions suitable for interaction with the magnetic surface of the disc. The radial dimensions of the gaps fit within the radial extent of the data track containing transitions so that only transitions of a single track are transduced by the interactive elements when the element is properly positioned over the respective data track.

The magnetic transducer is mounted by a slider to a rotary actuator and is selectively positioned by an actuator arm over a pre-selected track as directed by a processor. Track positioning is typically accomplished through a servo system to insure the element is properly centered over a track during a read or a write operation. One technique, called a "dedicated servo" technique, employs a disc surface, separate from the data surface, exclusively dedicated to servo information. Another technique, called an "embedded servo" technique, employs servo sectors equally spaced as "spokes" around the data track. The data tracks are ordinarily divided into respective pluralities of data sectors for storing fixed sized data blocks. Usually, the servo sectors are arranged independently of the data sectors so that the servo sectors often split data fields of the data sectors. The servo sectors include respective series of bursts of magnetic transitions recorded at various positions with respect to the center line of the track. Whenever a read element is over a servo sector, the head reads the servo bursts, and signals resulting from the transduction of those bursts are transmitted to a microprocessor for determining the position of the head. For example, in a servo burst system employing two sets of bursts each recorded on opposite sides of a centerline of a track, a read head positioned over the track centerline straddles both sets of bursts producing separate signals transduced from the bursts on each side of the track. When the signals transduced from bursts on opposite sides of the centerline are equal, the read head will be aligned on the track centerline.

The read and write transducing elements of a head are mounted to a head/slider mechanism such that the physical position with respect to each other does not vary. However, as the head is rotated along an arcuate path by the actuator arm between the inner and outer tracks of the disc, the angular relationship of the head to the tangent of the circular track varies, changing a radial offset between the read and write gaps of the transducing elements. This offset, known as "skew", affects the ability of the head to maintain track center for both read and write operations. Thus, during a write operation, the read element is offset from track center when the write element is centered on the track. For this reason, most systems provide for adjustment of the head position when switching from a read mode to a write mode, thereby accommodating the offset. The offset values are based on the geometric parameters of the head and actuator arm, and on the radial position of the head (i.e., the track being transduced). The offset values for each track or each group of tracks are typically recorded in a lookup table and provided to the controller to perform the offset correction based on the track confronting the head.

During a track following operation, a digital controller reads servo information, usually in the form of servo bursts on each side of track center, from the read element of the head to develop a position error signal (PES). The PES indicates the position error of the read element from the track centerline. When the head is in a read mode and at track center, the read element reads the servo bursts on each side of track center equally. When the head is in a write mode and at track center, the read element reads the servo bursts on each side of track center unequally, and an offset is added to the read signal to accommodate the write element offset and center the write element on track center. The PES is also used in a track seek operation to fine position the respective element to the track center.

In a typical disc drive, the actuator is subject to low frequency bias which tends to move the actuator away from the desired position. The bias can be the result of manufacturing variability, age, and environmental conditions. Examples of low frequency bias include the force of flexible cables attached to the actuator coil, friction in the actuator bearings, windage due to air circulation inside the disc assembly, gravitation forces if the actuator is not balanced, and electronic offsets to maintain a zero control. Magnetic disc drives incorporate a closed-loop control system which employ current system state information (such as current head position) together with commands, velocity and/or acceleration information to move the head in some optimal or near optimal manner. As a closed-loop plant, adaptive control techniques have been developed to compensate for changes in plant component characteristics and environment. One such technique is described in U.S. Pat. No. 5,369,345 to Phan et al. granted Nov. 29, 1994 for "Method and Apparatus for Adaptive Control".

The Phan patent describes a track following mode procedure that provides a compensated control based on the current head position, the current plant gain adjustment factor, and predicted states for head position, velocity and actuator bias. The plant gain adjustment factor is based on the measured position, the adjusted control, and a single frequency sampled sinusoidal signal. More particularly, Phan et al. injects a sinusoidal signal into the plant, and derives an output sinusoidal signal based on actual position data. The input and output sinusoidal signals are input to a gain control that adjusts the gain of the plant based on the relationship between the input and output sinusoidal signals. Low pass filters are required for both inputs to the gain control.

Prior adaptive calibration systems do not adequately optimize the control system to minimize steady state error due to low frequency disturbances. More particularly, they do not optimize the control system for steady state error rejection. Moreover, prior adaptive techniques do not consider the read-to-write offset in two-element head designs.

SUMMARY OF THE INVENTION

The present invention is directed to an adaptive servo calibration system useful for two-element heads. Additionally, the present invention is directed to optimizing the control system for steady state error rejection.

In one form of the invention, a process is provided for calibrating a gain control, such as a track follow gain control, for a track follow compensation means that operates an actuator to radially position a head with respect to a circular track of a rotating disc data storage apparatus. To calibrate the track follow compensate control, a sinusoidal signal is added to the position error signal during a servo interrupt to derive an error signal. The error signal is filtered to pass signals having a predetermined frequency. A gain adjustment signal is derived based on the filtered error signal and a desired signal that represents an error due to application of the sinusoidal signal to the track follow apparatus under ideal conditions. The gain adjustment signal is applied to the gain control of the track follow compensation means to adjust the amplitude of the control signal to the actuator.

Preferably, the gain adjustment signal is derived by detecting peaks in the filtered injected signal over a period between at least two successive peaks. The signal peak amplitude of the filtered injected signal is averaged over the period, and the averaged signal is subtracted from the desired signal. Also preferably, the derivation of the gain adjustment signal is repeated for a predetermined number of periods to derive a running average.

Preferably, the injecting of a sinusoidal signal, filtering the error signal and deriving an average gain adjustment signal is performed over a plurality of iterations. A running gain adjustment is computed based on the sum of the gain adjustment signal derived during a current iteration and the running gain adjustment computed during the immediately prior iteration. The computed running gain adjustment is stored in a lookup table for use in the track follow gain control to adjust the amplitude of the control signal to the actuator. In one embodiment, the number of iterations is a predetermined number. In another embodiment the number of iterations is based on the ratio of the gain adjustment signal derived during the current iteration to a running gain adjustment.

In one embodiment of the invention, the recording surfaces are segmented into a plurality of radial regions. A central track is identified in a first of the regions on a selected disc surface. A gain adjustment is derived for a corresponding region of each other recording surface and the gain adjustment signals derived from the several disc surfaces are averaged to adjust the track follow gain control.

In another form of the invention, calibrating apparatus calibrates a track follow gain control for a track follow compensation means so that the compensation means operates an actuator to radially position a head in respect to a track of a rotating disc data storage apparatus. The apparatus includes a source of sampled sinusoidal signals and a source of desired signals that represents an error due to application of the sinusoidal signal to the track follow apparatus under ideal conditions. Summing means adds the sinusoidal signal to the position error signal so that the track follow compensate means derives a control signal in response to the sum of the position error signal and the sinusoidal signal. A band pass filter receives the sum of the sinusoidal signal and the position error signal and passes only a sine error signal having a predetermined frequency. Sine error means derives a gain adjustment signal based on the signal passed by the band pass filter and the desired signal. The gain adjustment signal is applied to the track follow gain control to adjust the amplitude of the control signal to the actuator based on the sine error signal.

DETAILED DESCRIPTION OF THE PREFERRED EMBODIMENTS

Figure 1:
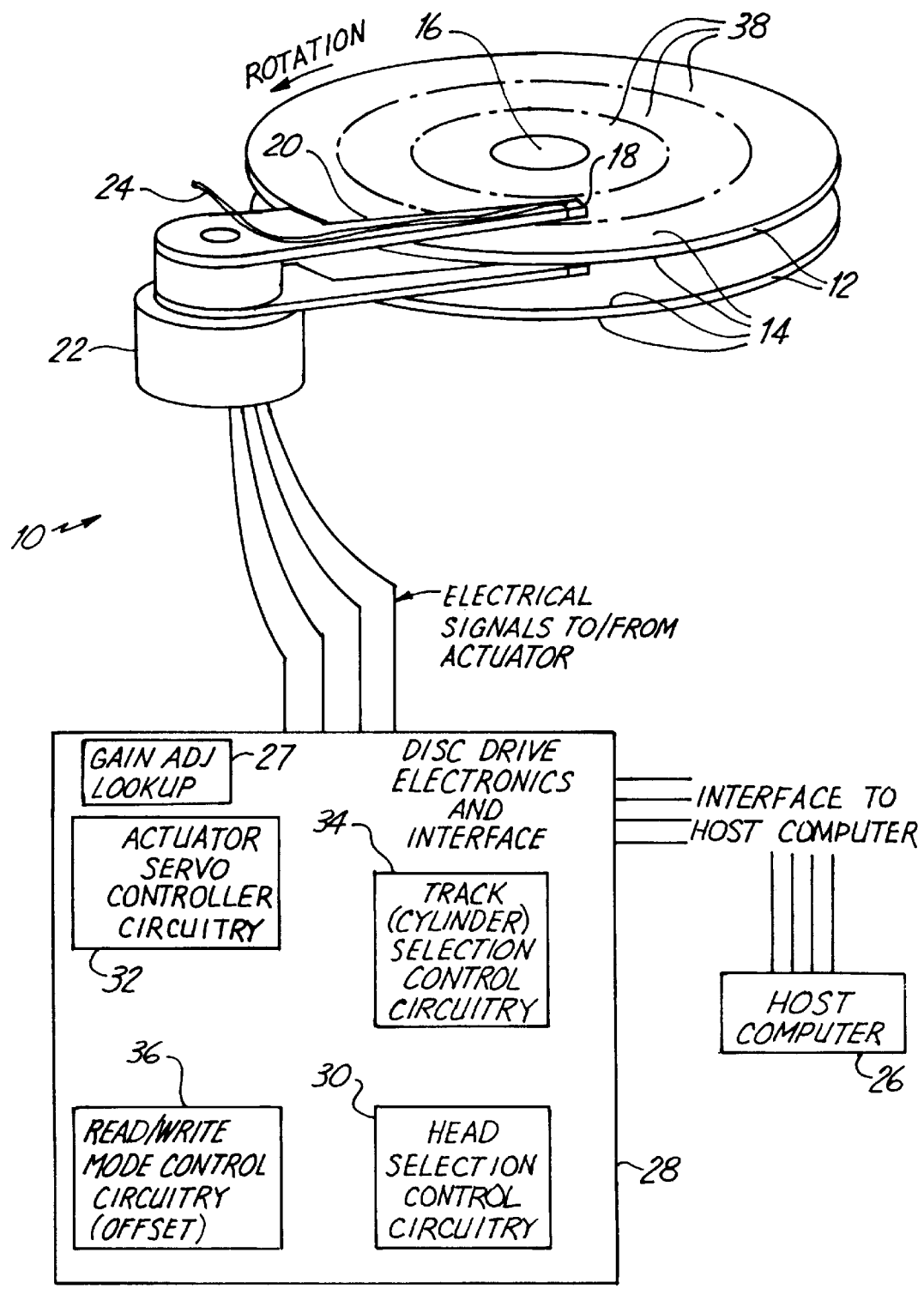
FIG. 1 is a schematic representation of a disc drive system useful in explaining the calibration system according to the present invention.

FIG. 1 illustrates a disc drive system 10 having one or more discs 12, each having one or more recording surfaces 14. Discs 12 are mounted to spindle 16 for rotation about the spindle axis, perpendicular to surfaces 14. A magnetic head 18 is physically mounted to an actuator arm 20 connected to actuator 22 to rotate about an axis of the actuator, parallel to the axis of spindle 16. Typically, there is a single head 18 confronting each disc surface 14. Therefore, in the example of FIG. 1 showing two discs and four disc surfaces, at least four heads 18 are mounted to at least three actuator arms 20 connected to actuator 22. Head 18 is connected by electrical communication cable 24 to drive electronics 28. The disc drive electronics and interface 28 is connected to host computer 26. Electronics 28 includes head selection control circuitry 30 to select one of heads 18 for transducing purposes with the respective disc surface 14, and an actuator servo control circuitry 32 which serves to control actuator 22 to position the selected head 18 over track center. In addition, the electronics includes track or cylinder selection control circuitry 34 which selects the track over which the selected head 18 is to be positioned, and read/write mode control circuitry 36 which corrects for the offset between the read and write elements of the head.

For purposes of the present invention, it is presumed that head 18 comprises separate read and write elements and are arranged so that the read element is responsive to magnetic fluctuations due to recording on the rotating disc surface to transduce those magnetic fluctuations to electrical signals for processing by computer 26. The separate write element transduces write signals from computer 26 to record magnetic fluctuations on the disc surface. Because the read and write elements are separate elements on head 18, they are slightly separated from each other. Due to the arcuate movement of head 18 about the axis of actuator 22, the relative radial position of the read and write elements changes as head 18 is moved by the actuator between the inner and outer tracks of disc surface 14. This offset, well known in the art, is defined by the physical dimension of the head and actuator arm, including the physical relationship of the read and write elements. Hence, the offset between the read and write element changes in a known, fixed relation with respect to the track being transduced.

Figure 2:
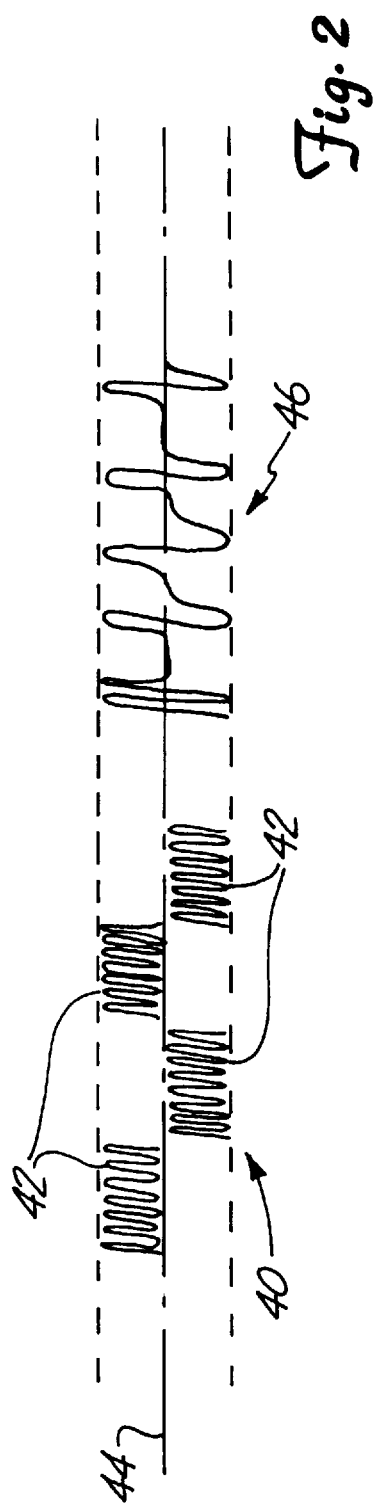
FIG. 2 illustrates the relationship of servo bursts to data on a recorded track.

In a recording system incorporating an embedded servo technology, servo data is recorded directly on the same track as are user data. Typically, the data track contains a plurality of data sectors for storing fixed-sized data blocks. The servo data appears in spokes or sectors that often split the data fields of the data sectors. As shown in FIG. 2, a servo spoke 40 might include a plurality of servo bursts 42 arranged so that successive bursts appear equally on one side and the other of track centerline 44. An interrupt might precede or follow bursts 42. Data sector 46 includes a variety of fields including a user data field, each recorded across the centerline 44 of the track.

During a write mode, the read element reads the servo bursts 42 to identify the position of the read element of the head. For example, in a servo burst system employing bursts recorded on opposite sides of centerline 44, the head is positioned at a write position when the read element straddles both bursts in proportion to the offset associated with the radial location of the track. As a result, the strength of the combined signals transduced from the bursts on one side of the centerline will bear a relation to the strength of the combined signals transduced on the other side of the centerline, the relation being based on the offset. If the servo signal strength indicates the write head is not on track center, actuator servo control circuitry 32 operates to adjust the position of the head to center the write element over track centerline 44. Subsequently, when the disc rotates to a position where the head confronts the data sectors, a high degree of confidence can be maintained that the write element is centered over the track for writing data.

Figure 3:
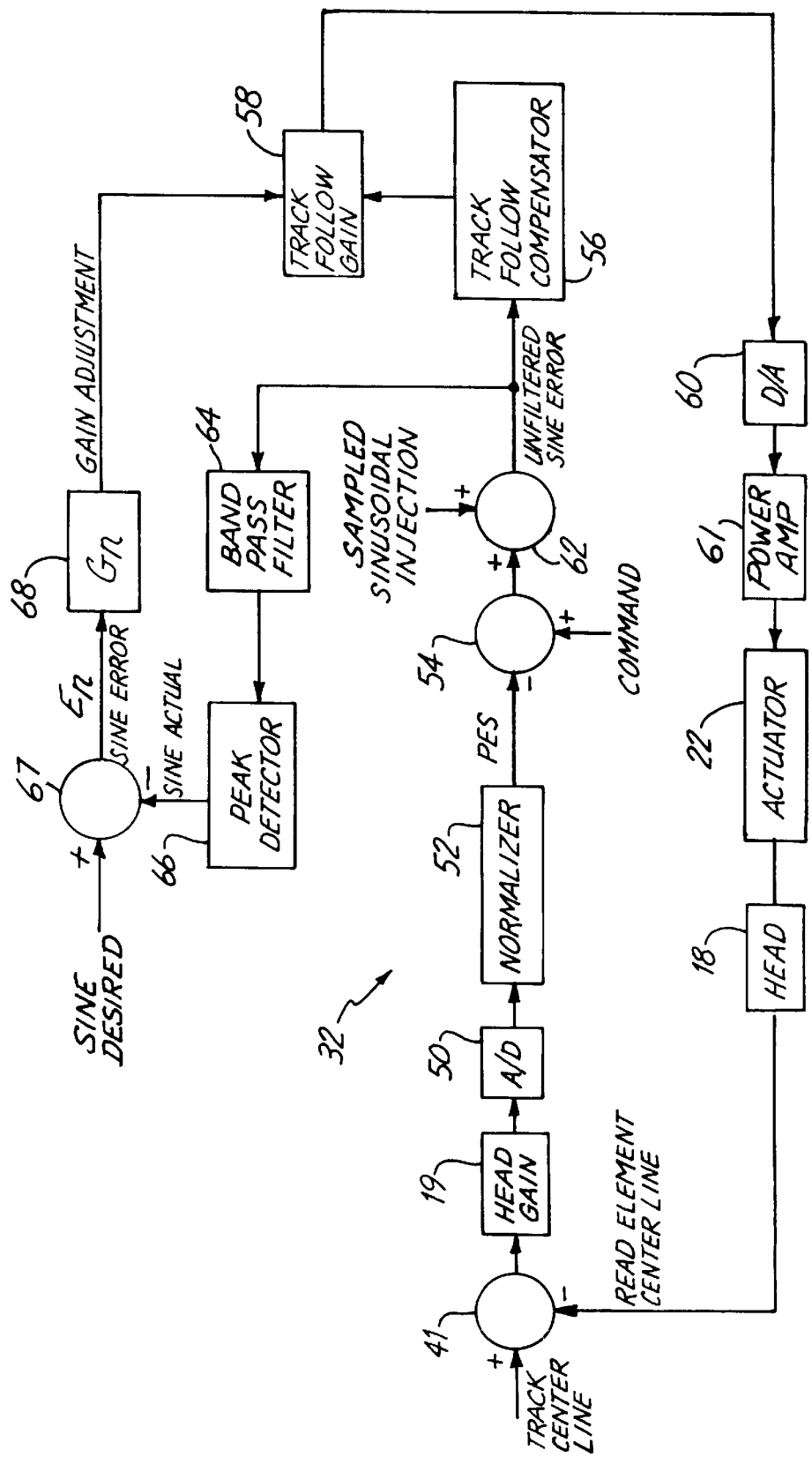
FIG. 3 is a block diagram of a servo control system with the head calibration system according to the present invention.

The present invention is directed to the actuator servo control circuitry 32 illustrated in FIG. 3, and particularly to a method and apparatus for calibrating the servo control circuitry for positioning head 18 over a track.

As shown in FIG. 3, a servo control circuit is a closed loop system in which the read element center line is compared to the track center line using the servo bursts 40. In a servo system, the process can be equated to a summing node 41 that subtracts the read element center line from the track center line so that head 18 produces a signal to head gain block 19. The strength of that signal is, in part, dependent on the position of the head relative to the track. The analog signals read by head 18 are applied to analog-to-digital (A/D) converter 50 which provides digital signals to normalizer 52. Normalizer 52 provides position error signals (PES) to summation device 54 where offset and track seek commands are added to the position error and applied to track follow compensator 56. Track follow compensator 56 provides a control signal based on the input signal. Track follow gain control 58 provides a preset gain to the control signal to adjust for environmental conditions, manufacturing variability, etc., within the disc drive system. The magnitude of the track follow gain is established during manufacture of the disc drive. The output of track follow compensator 56, including track follow gain control 58 is a gain-adjusted and compensated control signal that is applied to digital-to-analog (D/A) converter 60 to derive an analog signal which is amplified by power amplifier 61 to operate actuator 22. Actuator 22, which may include a voice coil motor (not shown), is responsive to the analog signal from D/A converter 60 to move head 18 by an amount and in a direction indicated by the control signal from track follow compensator 56 as amplitude adjusted by track follow gain control 58. Hence, the control signal is operative to move head 18 to a position closer to track center or a commanded location.

The present invention is directed to an apparatus and method for setting the magnitude of track follow gain control 58. The apparatus and method is employed during the manufacture of the disc drive system of FIG. 1, but the invention is equally applicable for re-calibration of the servo system of disc drive systems in the field. Hence, the invention may also be used to field-adjust disc drive systems. The calibration system of the present invention, employs a summing node 62 (which may be simply a connection terminal) by which a sampled sinusoidal signal is injected into the loop during an interrupt in the servo signal. The sampled sinusoidal signal has a predetermined amplitude and is at a predetermined frequency within a narrow portion of the frequency band of the PES signal. The sampled sinusoidal signal is summed with the PES output of normalizer 52 to provide an unfiltered sine error signal for input to track follow compensator 56. The unfiltered sine error signal is also applied to the input of band pass filter 64. Band pass filter 64 passes signals having a frequency equal to that of the injected sinusoidal signal. Hence, filter 64 passes only a sine error signal at the frequency of the injected sinusoidal signal. The filtered signal is applied to peak detector 66 to identify the peak-to-peak amplitude of the signal, which represents the actual error (sine actual) caused by the injected sinusoidal signal. The sine actual signal is subtracted from a sine desired signal at summing node 67. The sine desired signal has a predetermined amplitude that represents an error due to application of the sinusoidal signal to the actuator servo control circuitry under ideal conditions. For example, the amplitude of the desired signal may be selected such that the difference between the sine actual signal and the sine desired signal under ideal conditions is zero. The resulting difference signal is applied to integrator 68 to set the gain $G_n$ for the present iteration. The output of integrator 68 is a gain adjustment signal that is applied to track follow gain control 58 to adjust the overall plant gain. The gain-adjusted and compensated position control signal is applied to D/A converter 60.

With the track follow gain control properly set to the optimum gain, the calibration apparatus is removed or otherwise disabled. Consequently, when head 18 is reading servo data, the position correction accomplished by actuator 22 on head 18 is based on the control signal from track follow compensator 56 as adjusted by track follow gain control 58. The control signal is based on the position error signal (PES) from normalizer 52. The gain is set by the calibration apparatus of FIG. 3 according to the process described in connection with FIG. 4.

In an ideal control system, the desired value, D, minus the actual value, A, is equal to the error value, E:

$$D-A=E$$

Moreover, the actual value is equal to the error value multiplied by the transfer function, G(s):

$$A=E \cdot G(s)$$

In an open loop system, the response, $OL_R$, is simply the output over the input, or G(s). In a closed loop system, however, the response, $CL_R$, is the actual value divided by the desired value:

$$CL_R = \frac{A}{D},$$

from which a closed loop response can be derived:

$$CL_R = \frac{E \cdot G(s)}{E + E \cdot G(s)} = \frac{G(s)}{1 + G(s)}$$

Likewise, the error function of a closed loop system can be expressed as the error value divided by the desired value, from which an error function, $CL_E$, can be derived:

$$CL_E = \frac{E}{D} = \frac{1}{1 + G(s)}$$

Figure 4:
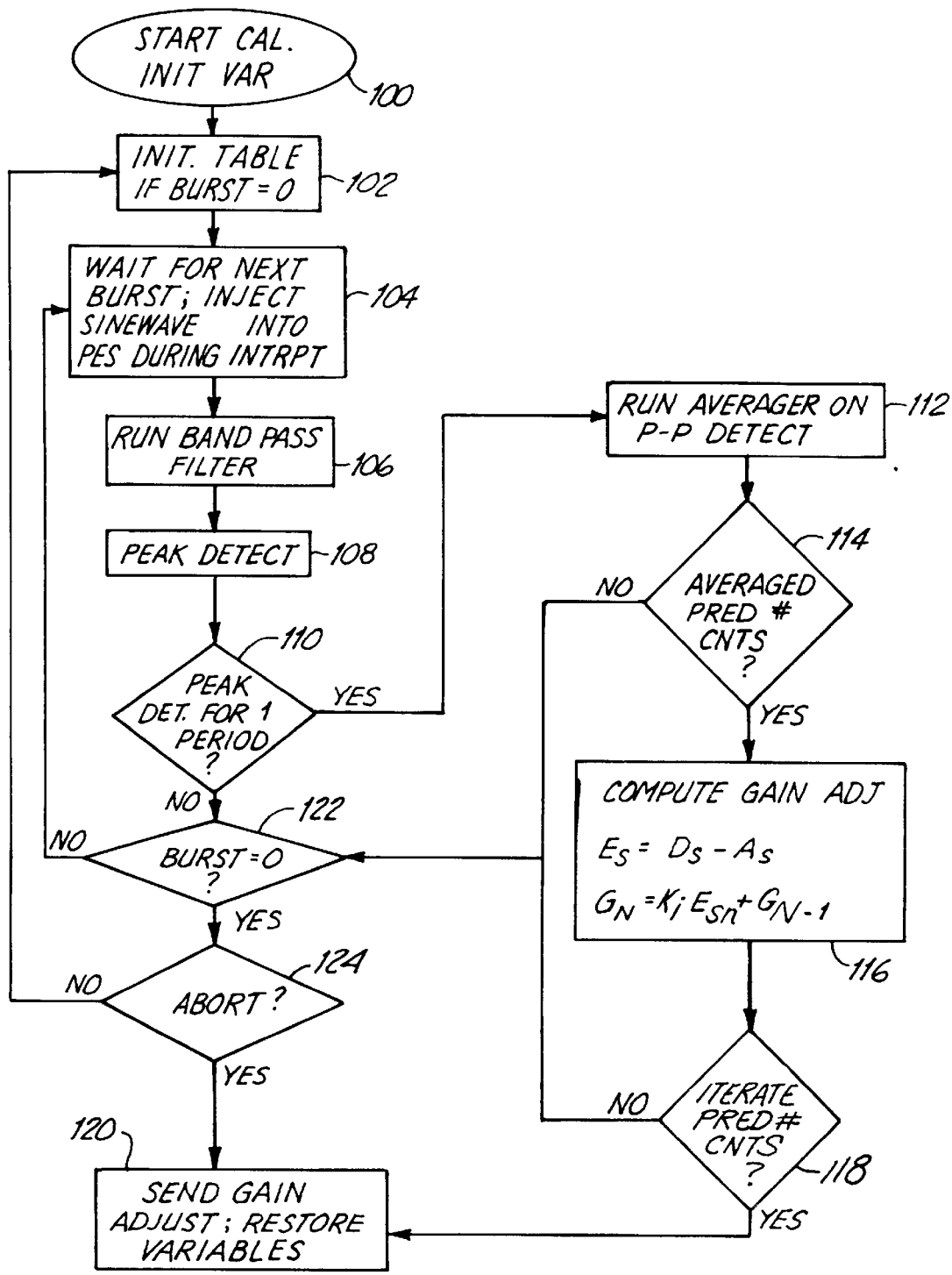
FIG. 4 is a flow diagram of a portion of the calibration process according to the present invention.
Figure 5:
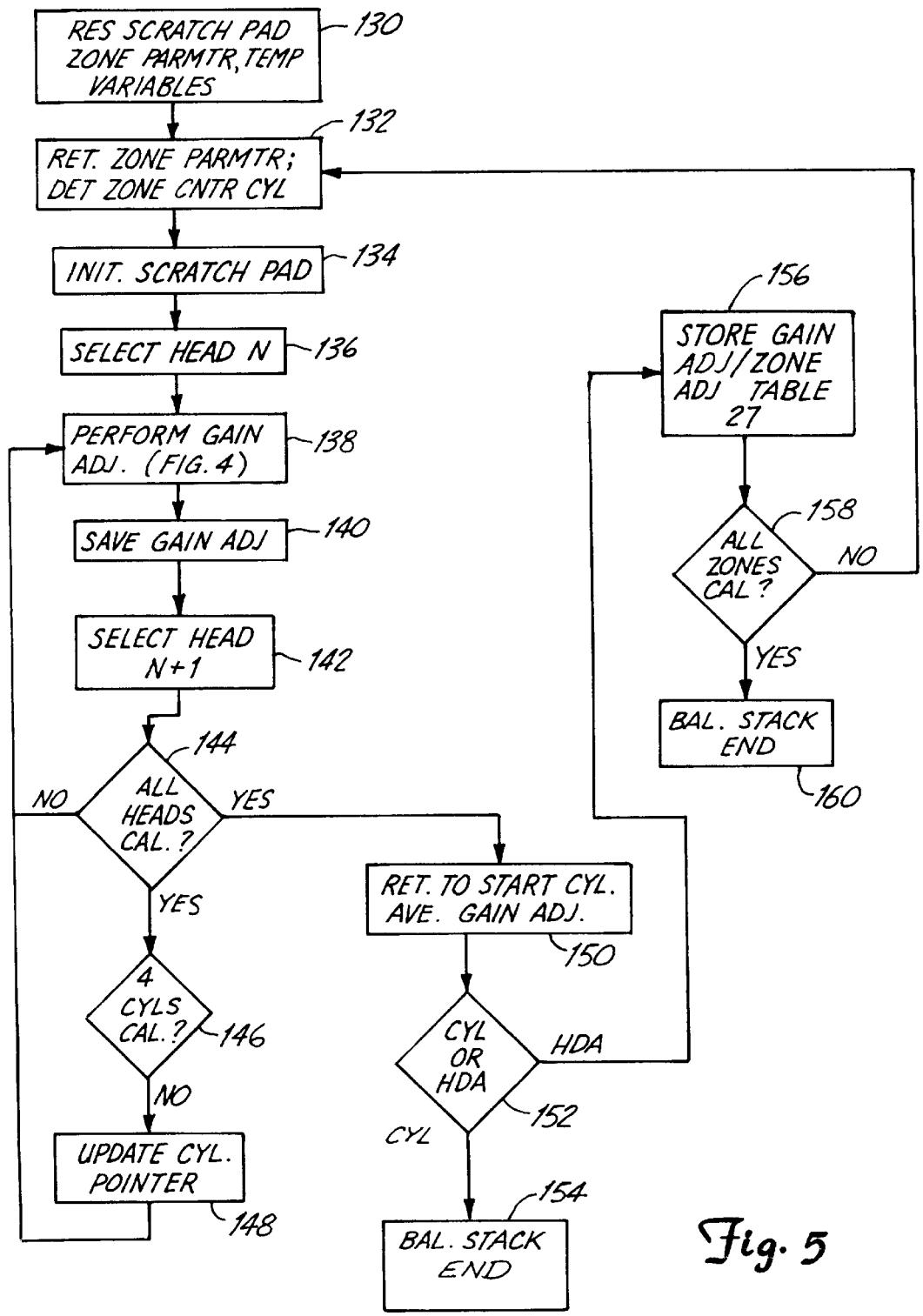
FIG. 5 is a flow diagram of the calibration process according to the present invention.

It will be appreciated that since the sampled sinusoidal signal injected at summing node 62 is within a narrow portion of the bandwidth of the PES signal, the error caused by the injected signal (under ideal conditions) is known. Therefore, the sine desired signal, from which the sine actual signal is subtracted at 67, represents the error that can be expected in circuitry 32 under ideal conditions due to the injection of the sampled sinusoidal signal. FIG. 4 is a flow chart of the process performed by the calibration system in accordance with the present invention from which the operation of the system may now be explained. FIG. 5 is a flow diagram of the entire calibration system.

As will be more fully understood hereinafter, the magnitude of the track follow gain may be different for tracks in different regions 38 (FIG. 1) on each disc surface 14. In one form of the invention, the gains for all heads 18 are averaged for each region of all disc surfaces to establish a gain for each region 38 for all disc surfaces 14. Alternatively, a different gain may be established for each head and each region of each disc surface, without regard to the cylinders described below. In either case, the several gains are stored in a lookup table 27 associated with disc drive electronics 28 (FIG. 1). FIG. 4 illustrates the process of establishing a gain for a given head in a given region.

At step 100, the variables for the algorithms are initialized and at step 102 the lookup tables are initialized and system waits until the read element of head 18 reads an index pulse on the track to which the head is being calibrated. The tables initialized include a lookup table of selected sinusoidal signals to be injected at 62 in FIG. 3 and the corresponding sine desired signals resulting from such an injection under ideal conditions. The sine desired signal stored in the table is used in the process and injected at step 67 in FIG. 3. As is well known in the art, an index pulse appears at a location on each track to indicate the "start" of that track and the presence of a first servo sector or spoke.

In response to the first servo burst in the first servo sector, the process identifies an initial sinusoidal signal from the lookup table, the sinusoidal signal to be applied at summing device 62 (FIG. 3). In practice, the sinusoidal signal will be at a frequency within a narrow portion of the bandwidth of the position error signal frequencies. It will be appreciated, however, that other signal frequencies may be used, but with modification of the bandpass characteristics of filter 64 (FIG. 3). At step 104, a predetermined amplitude of the selected sinusoidal signal is summed with the position error signal from head 18 during a servo interrupt. The resulting unfiltered sine error signal is applied to bandpass filter 64 at step 106 which passes only the signal having a frequency equal to the injected sinusoidal signal. The peaks of the resulting filtered sine error signal from bandpass filter 64 are detected by peak detector 66 at step 108.

At decision step 110, the process tests the peak detection to determine whether or not peaks have been detected covering at least one peak-to-peak period of the filtered sine error signal. If they have, at step 112 the average of the peak amplitudes is determined and at decision step 114 a determination is made as to whether or not a predetermined number of averaged signals have been generated at step 112. More particularly, it is preferred that the peak amplitudes averaged at step 112 be performed on at least ten peak-to-peak periods to identify a running average amplitude for the peaks. If the averages have not been performed for the predetermined number of peak-to-peak periods, the process loops back to step 104 and repeats until averages have been determined for the predetermined number of peak-to-peak periods. When the averages have been performed for the predetermined number of peak-to-peak periods, a gain adjustment is calculated at step 116.

The gain adjustment is determined for a predetermined number of iterations. During each iteration, the sine actual signal from peak detector 66 (FIG. 3) is subtracted from the sine desired signal from the lookup table to derive a sine error signal $E_n$. The gain adjustment is equal to the existing gain plus the running average of the sine error determined at step 112 (block 68 in FIG. 3). The gain adjustment for the current iteration ($G_n$) is thus calculated as $$G_n = G_{n-1} + E_n \cdot K_i$$

where $G_{n-1}$ is the gain adjustment magnitude for the immediately prior iteration, $E_n$ is the running average of the sine error of the current iteration identified at step 114 and is either positive or negative depending on whether the error was positive or negative, and $K_i$ is an integrator coefficient that determines the response of the gain adjustment. Initially, the gain is one, so the gain adjustment for the first iteration will be $K_i \cdot E_n + 1$. After the initial gain adjustment has been calculated at step 116, a decision is made at step 118 as to whether or not the gain adjustment has been calculated for a predetermined number of iterations for the selected head. Preferably, the predetermined number of iterations is set to ten although the number of iterations may be arbitrarily set. If the predetermined number of iterations are determined to have occurred, the resultant gain adjustment magnitude is stored in lookup table 27 in disc drive electronics 28 (FIG. 1) at step 120. If the predetermined number of iterations has not been completed, the process loops back to step 104 and repeats until the predetermined number of iterations at step 118 has been completed.

As an alternative to performing the gain adjustment averaging through a predetermined number of iterations, as at step 118, the number of iterations necessary to identify gain adjustment may be based upon a percent of error in the gain adjustment. Since the sine error for each successive iteration is smaller than the sine error of the previous iteration, when the sine error becomes so small as to be within a predetermined percent of the gain adjustment, the process may be terminated with the knowledge that the gain adjustment is within a predetermined tolerance, such as some preset percentage of target. Thus, if the ratio of the most recent sine error to the running gain adjustment is less than a threshold value, the iterations at step 118 may be halted.

At decisional step 110, a test determined whether or not peaks had been identified for a full period of the sinusoidal output. The full period was required for the peak-to-peak output at step 112. However, if the full period had not yet been found, the process branches to decisional step 122 which determines whether or not a full revolution of the disc has occurred. If it has, the index pulse that started the process at step 102 is identified to indicate that the current burst is burst 0. If the revolution has not occurred, the process loops back to step 104, to wait for the next burst. Noteworthy, step 122 also receives output from decisional steps 114 and 116 to loop back to step 104 if the predetermined number of peak-to-peak averages required for step 114 has not been accomplished or if the predetermined number of iterations (or the error is not within the predetermined value) for step 118 has not been completed. If the predetermined number of iterations have been completed, the gain adjustment process is complete and the final value of $G_n$ is determined at step 120 by summing the previously determined sine error measurements plus the initial conditions of $G_o = 1$. The finally determined value of $G_n$ then modifies the gain of track follow gain control 58 (FIG. 3).

FIG. 5 is a flow diagram illustrating the overall process of calibration of the servo system of which the process illustrated in the flow chart of FIG. 4 is a part. As shown in FIG.

1, head 18 moves in an arcuate path across the radius of disc surface 14, the exact path being dependent upon the length of actuator arm 20 and the position of the axis of actuator 22. Ordinarily, the write element of head 18 is positioned inbound along arm 20 from the read element. As a result, the read and write elements are laterally offset along the length of the track so that a point on the track will encounter the write element before the read element. As a result of the arcuate movement of the head between the inner and outer tracks, the center point of the read element tends to "swing" from an outboard (outer track) position relative to the center point of the write element to an inboard (inner track) position as the head moves from the outer track to the inner track. (Usually, drives are designed so that at some middle track, there is no radial offset between the center points of the read and write elements.) The radial offset, however, affects the calibration of the servo system. For this reason, one feature of the present invention is to provide calibration for the head/disc interface based on various radial regions of tracks. The regions may be identical to the zones employed for zone bit recording wherein each zone is recorded at a different data frequency to maintain data density relatively uniform across the disc surface. Alternatively, the regions employed for servo calibration may be independent of the zones used for zone bit recording.

Also as shown in FIG. 1, many disc drives employ a plurality of discs each with two recording surfaces. In the particular embodiment shown in FIG. 1, two discs 12 are shown, but it is understood that the two discs are merely representative of any number of discs. The tracks are recorded concentrically on the discs, and a given track on one disc forms a "cylinder" with corresponding tracks on other disc surfaces. Hence, all tracks at a given radial position on all four surfaces 14 in FIG. 1 form a "cylinder" having a unique radial position. The "cylinder" encompasses all tracks having the unique radial position, regardless of the number of disc surfaces 14.

As shown in FIG. 5, the calibration process commences at step 130 by reserving a location for a scratch pad, zone parameters (including boundaries) and temporary variables used during the process. At step 132, the zone parameters for a given zone 38 (FIG. 1) are identified and the center cylinder of the zone is identified for initial calibration. Thus, a track is identified for one of the regions 38 on all surfaces 14. At step 132, the scratch pad is initialized. More particularly, head accumulators are zeroed out, and the cylinder counter is reset to select a single cylinder. At step 136, one of heads 18 is selected for calibration in the initial track (at the center of the first region). At step 138, the gain adjustment is determined, as described in connection with FIG. 4. At step 140, the gain adjustment is saved in the scratch pad.

Upon completion of the gain adjustment for the first head for the cylinder, at steps 142 and 144 a determination is made as to whether or not all of the heads have been calibrated for the cylinder. If not, the process loops back to step 138 for the next head. When all of the heads have been calibrated for a single cylinder in a single zone at step 144, a decision is made at step 146 whether or not four adjacent cylinders have been calibrated. If four adjacent cylinders have not been calibrated, at step 148 the process loops back to step 138 to repeat the process for the next cylinder. If four adjacent cylinders have been calibrated, the gain adjustment is averaged at step 150 for all heads and all four cylinders for the zone and the average is stored for permanent use in track follow gain 58 each time a head encounters a track within the now calibrated zone 38. Hence, at the completion of step 150, all heads have been calibrated for four adjacent cylinders of a given zone.

At step 152, the process determines whether or not a full head/disc assembly (HDA) calibration is being accomplished to calibrate all zones of the disc(s), or whether the operation is a single zone operation. If the process is a single zone process, the process continues to step 154 to balance the stack and terminate the process as completed. If the operation is a full HDA operation, the process continues to step 156 where the gain adjustment values are stored in the table for all heads in the just-calibrated zone X. At decisional step 158, the decision is made whether all zones have been calibrated, and if not, the process loops back to step 132 for the next zone X+1. If all zones have been calibrated, the stack is balanced at step 160 and the process is ended.

The present invention thus provides an effective calibration process for calibrating the servo system of a disc drive, with separate regions being separately calibrated to address the effects of offset on the servo recovery process. The process is effective and is easy to perform in the factory. Moreover, the process can be adapted for field use to re-calibrate servo systems of disc drives in the field.

Although the present invention has been described with reference to preferred embodiments, workers skilled in the art will recognize that changes may be made in form and detail without departing from the spirit and scope of the invention.

What is claimed is:

1. Iterative calibration apparatus for calibrating a track follow gain control of an actuator controller that operates an actuator to radially position a head with respect to a track of a rotating disc data storage apparatus, the storage apparatus including a data storage disc having a plurality of concentric tracks on which data are stored, a head having a read element for transducing stored data to a servo signal, the actuator controller including control means responsive to the servo signal for generating a position error signal representative of the actual radial position of the head relative to a center radius of a track and track follow compensation means for deriving a control signal in response to the position error signal, the track follow gain control storing a gain adjustment representation for adjusting the amplitude of the control signal, and the actuator being responsive to the amplitude-adjusted control signal to radially move the head, the calibration apparatus comprising:

a source providing
   a sinusoidal signal having a predetermined frequency and a predetermined amplitude and
   a desired signal having a predetermined amplitude that represents an error derived from application of the sinusoidal signal to the track follow compensation means under ideal conditions;

summing means for iteratively adding the sinusoidal signal to the position error signal so that the track follow compensate means derives the control signal in response to the sum of the position error signal and the sinusoidal signal;

a band pass filter passing each iteration of the signal sum of the position error signal and the sinusoidal signal having the predetermined frequency;

sine error means for deriving a current gain adjustment signal based on the signal passed by the band pass filter and the desired signal, and means for adjusting the gain adjustment representation stored by the gain control means based on the current gain adjustment signal and the previously stored gain adjustment representation to thereby iteratively adjust the amplitude of the control signal, whereby the actuator adjusts the position of the head to adjust the position error signal for each iteration of the control signal so that the gain adjustment signal is adjusted for each iteration of the position error signal, the number of iterations of adding the sinusoidal signal to the position error signal being based on a ratio of the current gain adjustment signal to the previously stored gain adjustment representation.

2. The calibration apparatus of claim 1, wherein the sine error means comprises a peak detector for detecting peaks in the signal passed by the band pass filter, and means for deriving the gain adjustment signal based on an amplitude of successive peaks and the desired signal.

3. The calibration apparatus of claim 2, wherein the means for deriving the gain adjustment signal includes second summing means for deriving a signal difference between the amplitude of successive peaks and the amplitude of the desired signal, and integrator means responsive to the signal difference for deriving the gain adjustment signal.

4. A process for calibrating a track follow gain control of an actuator controller that operates an actuator to radially position a head with respect to a circular track of a rotating disc data storage apparatus, the storage apparatus including a data storage disc having a plurality of concentric tracks on which data are stored, the head having a read element for transducing stored data to a servo signal, the actuator controller including control means responsive to the servo signal for generating a position error signal representative of the actual radial position of the head relative to a center radius of a target track and track follow compensation means deriving a control signal in response to the position error signal, the track follow gain control adjusting the amplitude of the control signal, and an actuator responsive to the control signal to radially move the head, the process comprising injecting a sinusoidal signal having a predetermined amplitude at a predetermined frequency into the position error signal to derive an error signal;

filtering the error signal to pass signals having the predetermined frequency;

deriving a gain adjustment signal based on the filtered error signal and a desired signal having a predetermined amplitude that represents an error derived from application of the sinusoidal signal to the track follow compensation means under ideal conditions; and adjusting the gain of the gain control means to thereby adjust the amplitude of the control signal by
repeating the steps of injecting a sinusoidal signal, filtering the error signal and deriving a gain adjustment signal over a plurality of iterations,
computing a running gain adjustment signal based on the sum of the gain adjustment signal derived during a current iteration and the running gain adjustment signal computed during a prior iteration, the number of iterations being based on the ratio of the gain adjustment signal derived during the current iteration to the running gain adjustment signal, and
storing a representation of the computed running gain adjustment signal for the current iteration.

5. The process of claim 4, wherein the step of deriving a gain adjustment signal is performed by detecting peaks in the filtered error signal over a period between at least two successive peaks, averaging the signal amplitude of the peaks over the period and subtracting the averaged signal amplitude from the signal amplitude of the desired signal.

6. The process of claim 5, including repeating the steps of detecting peaks and averaging signal amplitude over a predetermined number of periods to derive a running average of the filtered error signal amplitude over a predetermined number of periods.

7. The process of claim 6, wherein the number of iterations comprising the plurality of iterations is a predetermined number.

8. The process of claim 4, wherein the number of iterations comprising the plurality of iterations is a predetermined number.

9. A process for calibrating a track follow gain control of an actuator controller that operates an actuator to radially position a head with respect to a circular track of a rotating disc data storage apparatus, the storage apparatus including a data storage disc having a plurality of concentric tracks on which data are stored, the head having a read element for transducing stored data to a servo signal, the actuator controller including control means responsive to the servo signal for generating a position error signal representative of the actual radial position of the head relative to a center radius of a target track and track follow compensation means deriving a control signal in response to the position error signal, the track follow gain control adjusting the amplitude of the control signal, and an actuator responsive to the control signal to radially move the head, the process comprising injecting a sinusoidal signal having a predetermined amplitude at a predetermined frequency into the position error signal during an interrupt of the servo signal to derive an error signal;

filtering the error signal to pass signals having the predetermined frequency;

deriving a gain adjustment signal based on the filtered error signal and a desired signal having a predetermined amplitude that represents an error derived from application of the sinusoidal signal to the track follow compensation means under ideal conditions; and adjusting the gain of the gain control means based on the gain adjustment signal to thereby adjust the amplitude of the control signal.

10. A process for calibrating a track follow gain control of an actuator controller that operates an actuator to radially position a head with respect to a circular track of a rotating disc data storage apparatus, the storage apparatus including a plurality of data storage disc surfaces each having a plurality of concentric tracks on which data are stored, the disc surfaces being substantially parallel to each other in stacked relation so that a concentric track of one disc surface forms a cylinder with corresponding track of another disc surface, a plurality of heads each confronting a corresponding disc surface, each head having a write element to transduce write signals to store data on a track and a separate read element for transducing stored data to a servo signal, the read element being radially offset from the write element by an amount based on the radial position of the track confronting the head, the actuator controller including control means responsive to the servo signal for generating a position error signal representative of the actual radial position of the head relative to a center radius of a target track and track follow compensation means deriving a control signal in response to the position error signal, the track follow gain control adjusting the amplitude of the control signal, and the actuator being responsive to the control signal to radially move the head, the process comprising a) segmenting the recording surfaces into a plurality of radial zones;

b) identifying a central track in a first of the zones on a selected one of the disc surfaces;

c) transducing stored data to a servo signal by the read element of the head confronting the selected disc surface;

d) generating a position error signal based on the transduced servo signal;

e) injecting a sinusoidal signal having a predetermined amplitude at a predetermined frequency into the position error signal during an interrupt in the servo signal to derive an error signal;

f) filtering the error signal to pass signals having the predetermined frequency;

g) deriving a gain adjustment signal based on the filtered error signals and a desired signal having a predetermined amplitude that represents an error derived from application of the sinusoidal signal to the track follow compensation means under ideal conditions;

h) repeating steps b) through g) for a first of the zones on a disc surface different from the selected disc surface, such that the central track of the first zone of the different disc surface forms a single cylinder with the central track of the first zone of the selected disc surface;

i) averaging the gain adjustment signals derived from the several steps h); and j) adjusting the gain of the gain control means based on the averaged gain adjustment signal to thereby adjust the amplitude of the control signal.

11. The process of claim 10, including repeating steps b) through j) for each zone.

12. The process of claim 10, wherein the step of deriving a gain adjustment signal is performed by detecting peaks in the filtered error signal over a period between at least two successive peaks, averaging the signal amplitude of the peaks over the period and subtracting the averaged signal amplitude from the signal amplitude of the desired signal.

13. The process of claim 12, including repeating the steps of detecting peaks and averaging signal amplitude over a predetermined number of periods to derive a running average of the filtered error signal amplitude over a predetermined number of periods.

14. The process of claim 13, wherein the gain of the gain control is adjusted by repeating the steps of injecting a sinusoidal signal, filtering the error signal and deriving a gain adjustment signal over a plurality of iterations, computing a running gain adjustment signal based on the sum of the gain adjustment signal derived during a current iteration and the running gain adjustment signal computed during a prior iteration, and storing a representation of the computed running gain adjustment signal for the current iteration.

15. The process of claim 10, wherein the gain of the gain control is adjusted by repeating the steps of injecting a sinusoidal signal, filtering the error signal and deriving a gain adjustment signal over a plurality of iterations, computing a running gain adjustment signal based on the sum of the gain adjustment signal derived during a current iteration and the running gain adjustment signal computed during the next prior iteration, and storing a representation of the computed running gain adjustment signal for the current iteration.

16. The process of claim 15, wherein the number of iterations comprising the plurality of iterations is a predetermined number.

17. The process of claim 15, wherein the number of iterations comprising the plurality of iterations is based on the ratio of the gain adjustment signal derived during the current iteration to a running gain adjustment signal.

18. Calibrating apparatus for calibrating a track follow gain control of an actuator controller that operates an actuator to radially position a head with respect to a track of a rotating disc data storage apparatus, the storage apparatus including a data storage disc having a plurality of concentric tracks on which data are stored, a head having a read element for transducing stored data to a non-continuous servo signal, the actuator controller including control means responsive to the servo signal for generating a position error signal representative of the actual radial position of the head relative to a center radius of a track and track follow compensation means for deriving a control signal in response to the position error signal, the track follow gain control adjusting the amplitude of the control signal, and the actuator being responsive to the amplitude-adjusted control signal to radially move the head, the calibration apparatus comprising:

a source providing
  a sinusoidal signal having a predetermined frequency and a predetermined amplitude and
  a desired signal having a predetermined amplitude that represents an error derived from application of the sinusoidal signal to the track follow compensation means under ideal conditions;

summing means for adding the sinusoidal signal to the position error signal during an interrupt in the servo signal so that the track follow compensate means derives the control signal in response to the sum of the position error signal and the sinusoidal signal;

a band pass filter passing the signal sum of the position error signal and the sinusoidal signal having the predetermined frequency;

sine error means for deriving a gain adjustment signal based on the signal passed by the band pass filter and the desired signal, and means for adjusting the gain of the gain control means based on the gain adjustment signal to thereby adjust the amplitude of the control signal.

19. The calibration apparatus of claim 18, wherein the sine error means comprises a peak detector for detecting peaks in the signal passed by the band pass filter, and means for deriving the gain adjustment signal based on an amplitude of successive peaks and the desired signal.

20. The calibration apparatus of claim 19, wherein the means for deriving the gain adjustment signal includes second summing means for deriving a signal difference between the amplitude of successive peaks and the amplitude of the desired signal, and integrator means responsive to the signal difference for deriving the gain adjustment signal.

* * * * *